United States Patent
Hotta

(10) Patent No.: US 12,539,499 B2
(45) Date of Patent: Feb. 3, 2026

(54) MIXER AND POWER TOOL

(71) Applicant: MAKITA CORPORATION, Anjo (JP)

(72) Inventor: Ryohei Hotta, Anjo (JP)

(73) Assignee: MAKITA CORPORATION, Anjo (JP)

( * ) Notice: Subject to any disclaimer, the term of this patent is extended or adjusted under 35 U.S.C. 154(b) by 716 days.

(21) Appl. No.: 17/947,636

(22) Filed: Sep. 19, 2022

(65) Prior Publication Data

US 2023/0149870 A1 May 18, 2023

(30) Foreign Application Priority Data

Nov. 16, 2021 (JP) .................................. 2021-186610

(51) Int. Cl.
| | |
|---|---|
| *B01F 33/501* | (2022.01) |
| *B01F 27/112* | (2022.01) |
| *B01F 35/32* | (2022.01) |
| *B01F 101/28* | (2022.01) |
| *B01F 101/30* | (2022.01) |

(52) U.S. Cl.
CPC ........ *B01F 33/5011* (2022.01); *B01F 27/112* (2022.01); *B01F 35/3204* (2022.01); *B01F 2101/28* (2022.01); *B01F 2101/30* (2022.01)

(58) Field of Classification Search
CPC ................ B01F 35/3204; B01F 33/501; B01F 33/5011; B01F 27/112; B01F 2101/28
See application file for complete search history.

(56) References Cited

U.S. PATENT DOCUMENTS

| | | | | | |
|---|---|---|---|---|---|
| 2,023,460 | A | * | 12/1935 | Beach ................... | B01F 35/413 366/285 |
| 2,048,183 | A | * | 7/1936 | Dormeyer ............... | H02K 7/16 366/601 |
| 5,516,208 | A | * | 5/1996 | Givant .............. | B01F 35/32025 99/348 |
| 6,273,601 | B1 | * | 8/2001 | Hlavka ............... | B01F 33/5011 366/129 |
| 2009/0277975 | A1 | * | 11/2009 | Mattson ................. | B01F 33/86 239/149 |
| 2015/0231581 | A1 | * | 8/2015 | Dalmau Requejo ...... | B25F 5/02 366/129 |

FOREIGN PATENT DOCUMENTS

| | | |
|---|---|---|
| DE | 202010014783 U1 | 1/2011 |
| DE | 202021102680 U1 | 7/2021 |
| JP | 2013-86228 A | 5/2013 |

OTHER PUBLICATIONS

May 27, 2025 Office Action issued in Japanese Patent Application No. 2021-186610.

* cited by examiner

*Primary Examiner* — Marc C Howell
(74) *Attorney, Agent, or Firm* — Oliff PLC

(57) ABSTRACT

A mixer is transportable and storable without using much space. A mixer includes a body including a motor and an output shaft rotatable when driven by the motor, extending downward, and being connectable to a mixer shaft, a handle attachable to the body, and a lock unit located on the body. The lock unit is engageable with the handle at an attachment position of the handle to the body to lock the handle at the attachment position. The lock unit is operable to disengage from the handle to unlock the handle at the attachment position.

13 Claims, 9 Drawing Sheets

MIXER AND POWER TOOL

CROSS-REFERENCE TO RELATED APPLICATIONS

This application claims the benefit of priority to Japanese Patent Application No. 2021-186610, filed on Nov. 16, 2021, the entire contents of which are hereby incorporated by reference.

BACKGROUND

1. Technical Field

The present disclosure relates to a mixer for mixing fluid materials, such as paint and mortar, and non-fluid materials, such as sand and gravel, and to a power tool including an output shaft protruding downward from a body and to which a tip tool is connectable.

2. Description of the Background

A mixer has a spindle protruding from a body accommodating a motor, and a mixer shaft connectable to the spindle to receive rotation of the motor. A blade is attached to the mixer shaft. The mixer can mix a material such as paint with the blade rotating together with the mixer shaft. A handle is fixed to the body. An operator holds left and right grips on the handle to support the body (e.g., German Utility Application Publication No. 202010014783).

BRIEF SUMMARY

A known double-handled mixer has a handle protruding largely to the left and to the right from a body. The mixer with this structure uses much space for transportation and for storage. The same occurs to, for example, a power tool such as an earth auger including an output shaft protruding downward from a body with a handle and to which a tip tool such as an auger bit is connectable.

One or more aspects of the present disclosure are directed to a mixer and a power tool that are transportable and storable without using much space.

A first aspect of the present disclosure provides a mixer, including:
- a body including a motor and an output shaft rotatable when driven by the motor, the output shaft extending downward and being connectable to a mixer shaft;
- a handle attachable to the body; and
- a lock unit located on the body, the lock unit being engageable with the handle at an attachment position of the handle to the body to lock the handle at the attachment position, the lock unit being operable to disengage from the handle to unlock the handle at the attachment position.

A second aspect of the present disclosure provides a mixer, including:
- a body including a motor and an output shaft rotatable when driven by the motor, the output shaft extending downward and being connectable to a mixer shaft;
- a handle attachable to the body; and
- a lock unit located on the handle, the lock unit being engageable with the body at an attachment position of the handle to the body to lock the handle at the attachment position, the lock unit being operable to disengage from the body to unlock the handle at the attachment position.

A third aspect of the present disclosure provides a power tool, including:
- a body including a motor and an output shaft rotatable when driven by the motor, the output shaft extending downward and being connectable to a tip tool;
- a handle attachable to the body; and
- a lock unit located on the body, the lock unit being engageable with the handle at an attachment position of the handle to the body to lock the handle at the attachment position, the lock unit being operable to disengage from the handle to unlock the handle at the attachment position.

The mixer and the power tool according to the above aspects of the present disclosure are transportable and storable without using much space.

DETAILED DESCRIPTION

Embodiments

Embodiments of the present disclosure will now be described with reference to the drawings.

Figure 1:
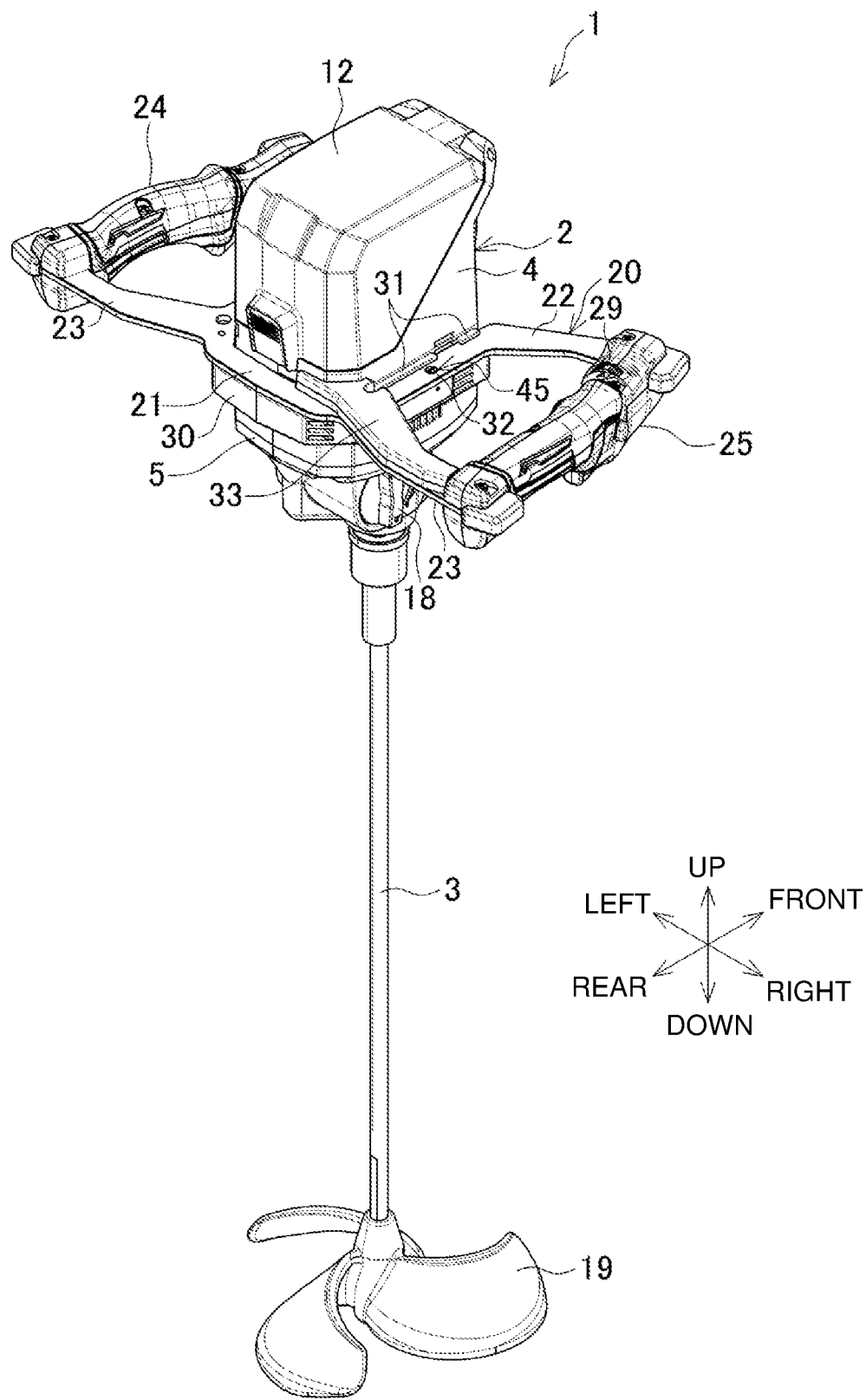
FIG. 1 is an overall perspective view of a mixer.
Figure 2:
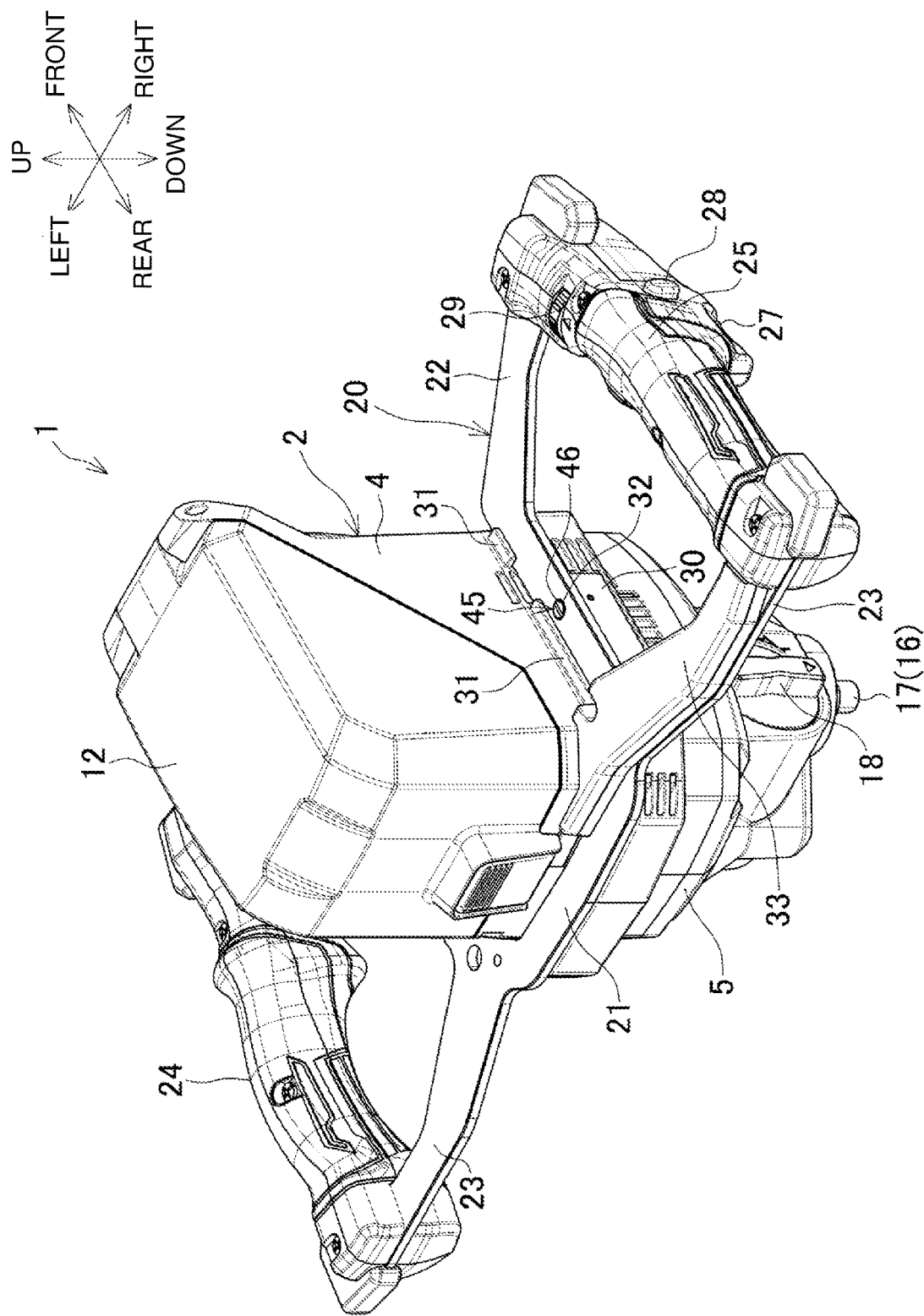
FIG. 2 is a perspective view of a body of the mixer.
Figure 3:
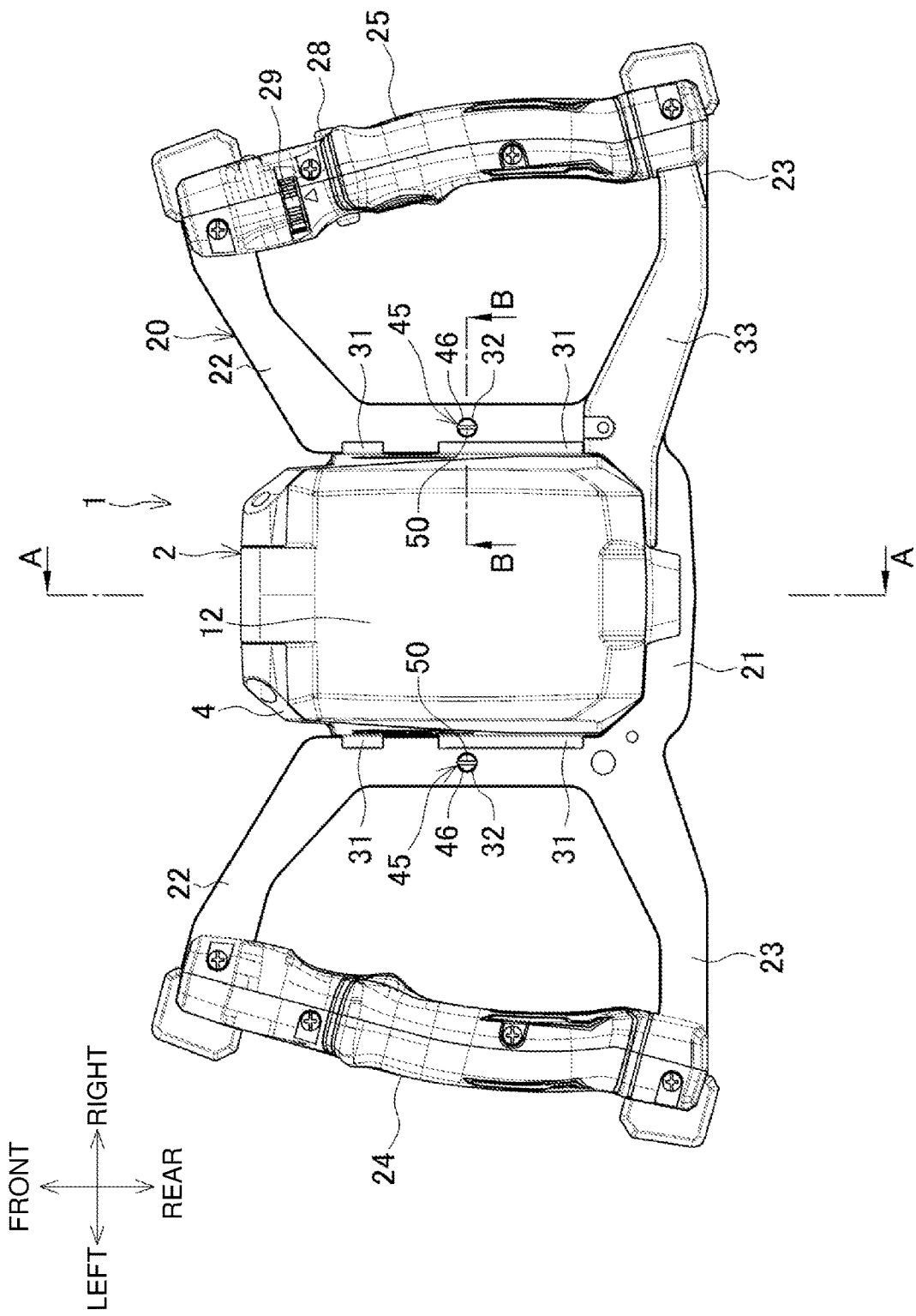
FIG. 3 is a plan view of the body of the mixer.
Figure 4:
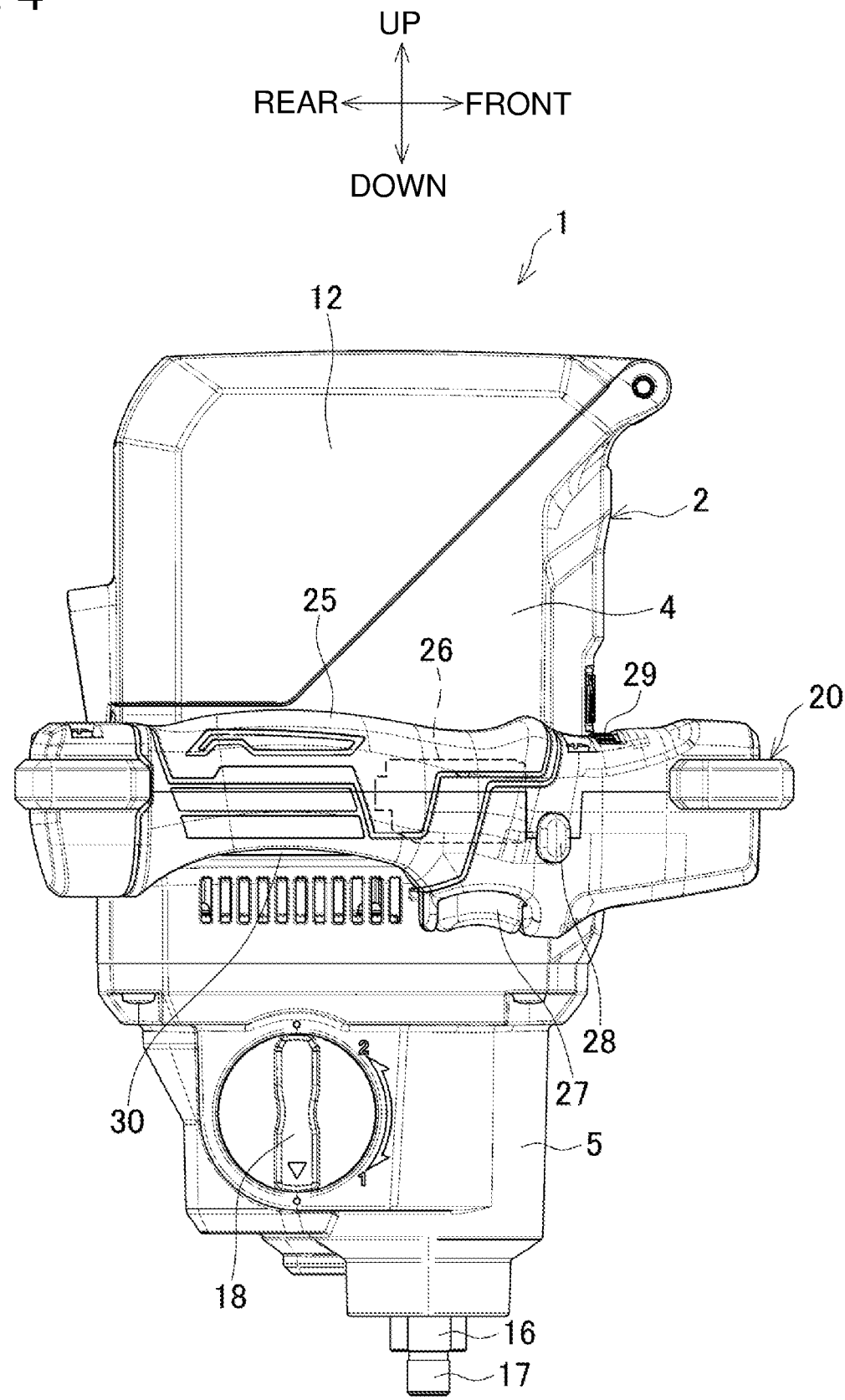
FIG. 4 is a side view of the body of the mixer.
Figure 5:
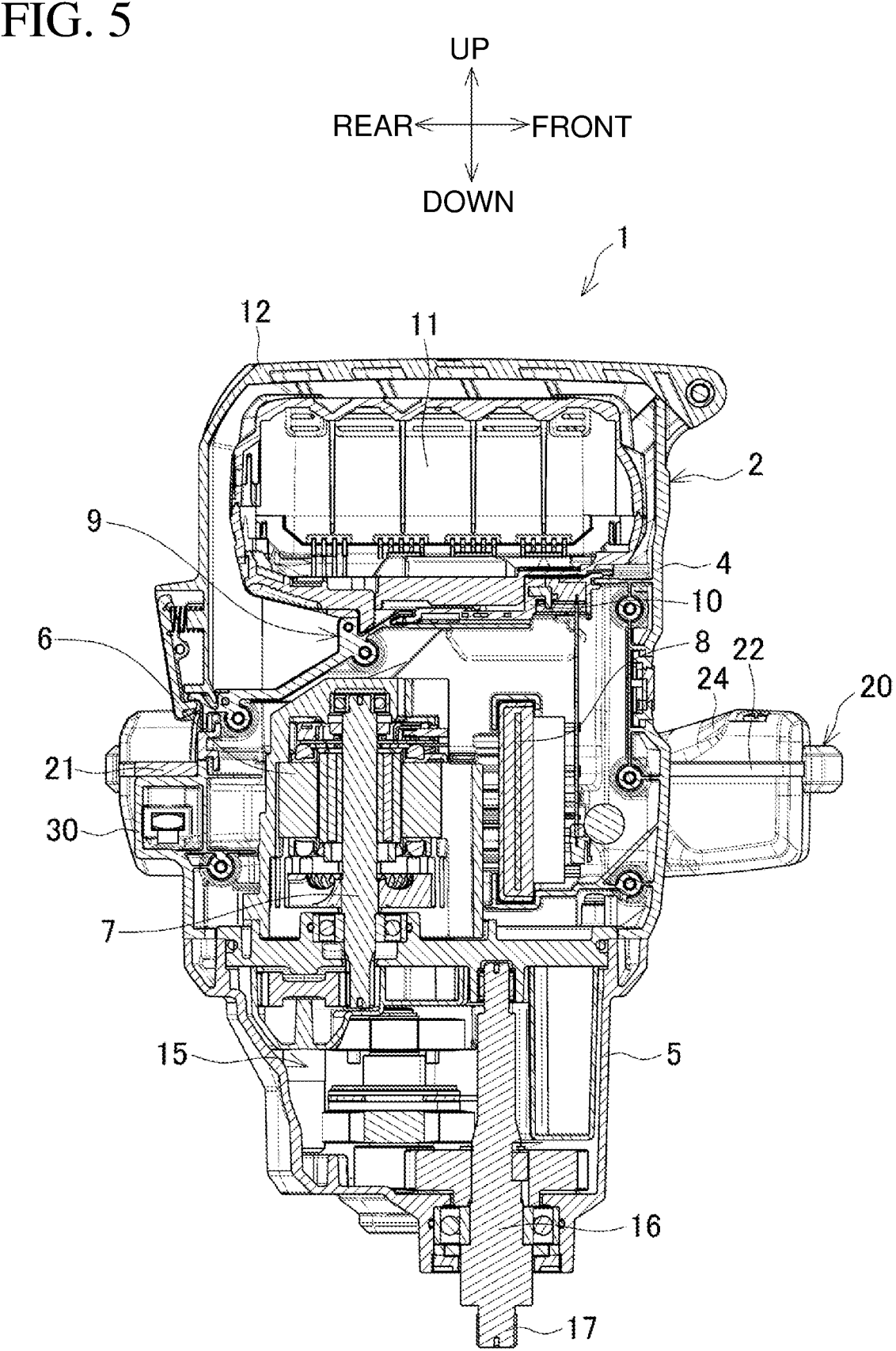
FIG. 5 is a cross-sectional view taken along line A-A in FIG. 3.

FIG. 1 is an overall perspective view of a rechargeable mixer 1 as an example of a mixer. FIG. 2 is a perspective view of a body. FIG. 3 is a plan view of the body. FIG. 4 is a side view of the body. FIG. 5 is a cross-sectional view taken along line A-A in FIG. 3.

The mixer 1 includes a body 2 and a mixer shaft 3.

The body 2 includes, as its housing, a motor housing 4 and a reducer housing 5. The motor housing 4 accommodates a motor 6 in its rear portion and a controller 8 in its front portion. The motor 6 is supported with a rotational shaft 7 extending downward. The rotational shaft 7 has its lower end protruding in the reducer housing 5.

The motor housing 4 has a battery mount 9 on its upper portion. The battery mount 9 includes a terminal base 10. A battery pack 11 is slid on and attached to the terminal base 10 from the rear. A battery cover 12 is attached to the upper portion of the motor housing 4. The battery cover 12 covers the battery pack 11 and the battery mount 9 from above.

The reducer housing 5 accommodates a reducer 15. The reducer 15 includes a spindle 16. The spindle 16 protrudes downward from the lower end of the reducer housing 5. The spindle 16 has a thread 17 on its lower end. The reducer 15 reduces rotation of the rotational shaft 7 and transmits the reduced rotation to the spindle 16. A switching lever 18 is located on a right side surface of the reducer housing 5. The rotational speed of the spindle 16 is switchable between two levels, or specifically, high and low, in response to an operation on the switching lever 18.

The mixer shaft 3 is coaxially connectable with the thread 17 on the spindle 16. A blade 19 is attached to a lower end of the mixer shaft 3.

A handle 20 is attached to the body 2. The handle 20 includes a fixture 21, a pair of left and right front arms 22, a pair of left and right rear arms 23, a left grip 24, and a right grip 25.

The fixture 21 is attached to the motor housing 4. The fixture 21 is U-shaped as viewed in plan and surrounds left and right portions and a rear portion of the body 2 and is open at the front. The fixture 21 is a vertically thin metal sheet.

The front arms 22 are integral with the fixture 21. The pair of left and right front arms 22 extend from the front end of the fixture 21 outward to the left and to the right. The rear arms 23 are integral with the fixture 21. The pair of left and right rear arms 23 extend from a rear portion of the fixture 21 outward to the left and to the right.

The left grip 24 and the right grip 25 extend across the ends of the front arms 22 and the rear arms 23 in the front-rear direction. The left grip 24 and the right grip 25 have their front ends fastened to the ends of the front arms 22 with rear ends screwed and fastened to the ends of the rear arms 23.

The right grip 25 accommodates a switch 26 (FIG. 4). The switch 26 includes a trigger 27. The trigger 27 protrudes from a lower surface of the right grip 25. A lock button (not shown) is located on a left side surface of the right grip 25. The lock button locks the trigger 27 being pressed. A lock lever 28 is located in front of the switch 26. The lock lever 28 can slide between a position at which the trigger 27 is locked and cannot be pressed and a position at which the trigger 27 is allowed to be pressed.

The lock lever 28 includes an adjustment dial 29 on its front portion. The rotational speed of the motor 6 can be adjusted by rotating the adjustment dial 29. The adjustment dial 29 is exposed on an upper surface of the right grip 25.

A flange 30 is located at the outer peripheral surface of the motor housing 4. The flange 30 supports the fixture 21 from below. Above the flange 30, multiple guide ribs 31 are located on the left and right side surfaces of the motor housing 4. The guide ribs 31 extend parallel to the flange 30 in the front-rear direction. The vertical distance between the flange 30 and each of the guide ribs 31 is the distance that allows the fixture 21 to be fitted and inserted from the front. The degree by which each of the guide ribs 31 protrudes to the left or to the right is smaller than the degree by which the flange 30 protrudes.

The fixture 21 can be inserted and removed from the rear of the body 2 between the flange 30 and each of the left and the right guide ribs 31. When inserted between the flange 30 and the left and right guide ribs 31, the fixture 21 is restricted from moving forward any further at the position shown in FIG. 5 at which the rear portion of the fixture 21 is in contact with the rear surface of the body 2. This position is the attachment position of the handle 20. A pair of engagement holes 32 are formed in substantially the middle in the front-rear direction on the left and the right of the fixture 21.

Figure 6:
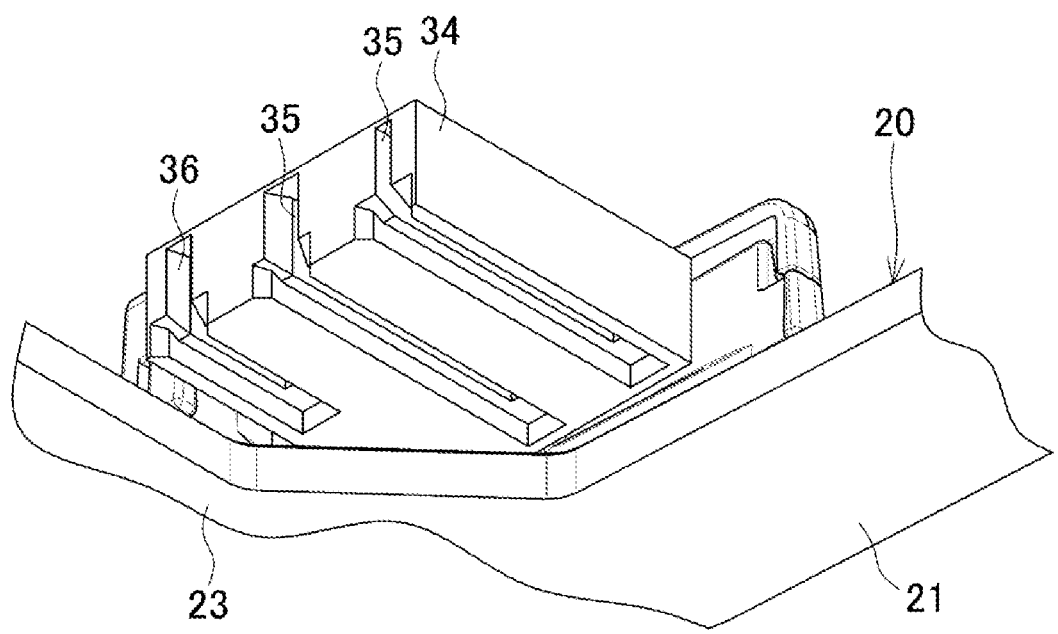
FIG. 6 is a diagram describing a male connector.

A lead wire cover 33 is screwed on an upper surface of the right rear arm 23 and an upper surface of the fixture 21. The lead wire cover 33 contains lead wires (not shown) that are routed and connected to the switch 26 in the right grip 25 and to the board in the adjustment dial 29. As shown in FIG. 6, each lead wire is connected to a terminal plate in a male connector 34 located on a right upper surface of the rear portion of the fixture 21. The male connector 34 has two slits 35 for the switch 26 and one slit 36 for the adjustment dial 29 in the front-rear direction. The slits 35 and the slit 36 receive terminal plates (not shown).

Figure 7:
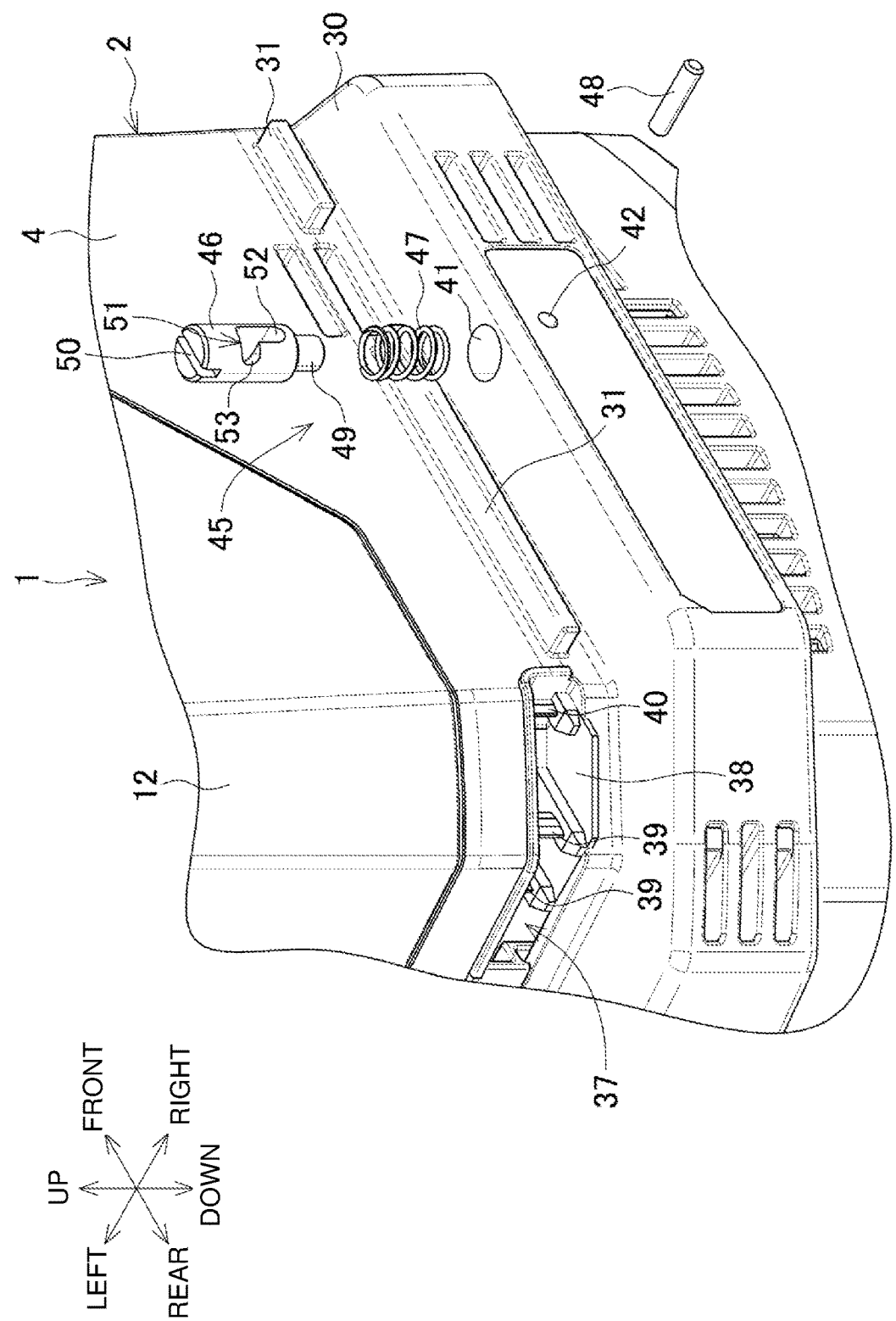
FIG. 7 is an exploded perspective view of a lock unit, with a handle removed.

As shown in FIG. 7, a receptacle 37 for the male connector 34 is located on the rear surface of the motor housing 4. The male connector 34 can be inserted into the receptacle 37 when the handle 20 is at the attachment position. The receptacle 37 accommodates a female connector 38. The female connector 38 includes two terminal plates 39 for the switch 26 and one terminal plate 40 for the adjustment dial 29 extending in the front-rear direction. The terminal plates 39 for the switch 26 are connected to the controller 8 and to the terminal base 10 with lead wires (not shown) inside the motor housing 4. The terminal plate 40 for the adjustment dial 29 is connected to the controller 8 with a lead wire (not shown) inside the motor housing 4.

The flange 30 has, on its left and right portions, blind holes 41 each with an open upper end. The blind holes 41 are immediately below the engagement holes 32 in the handle 20 at the attachment position. The blind holes 41 receive lock units 45 for the handle 20. The lock units 45 will be described in detail below. To represent the left and right lock units 45 that are symmetrical to each other, the right lock unit 45 alone will be described.

As shown in FIG. 7, the lock unit 45 includes a lock pin 46, a coil spring 47, and a retainer pin 48.

The lock pin 46 is a cylindrical rod. The lock pin 46 is fitted in the blind hole 41 and is movable in the vertical direction. A smaller-diameter portion 49 coaxially protrudes downward from the lock pin 46. The lock pin 46 has, on its upper end, an engagement groove 50 extending across the diameter. The lock pin 46 has a through-hole 51 extending through the lock pin 46 across the diameter. The through-hole 51 includes a guide hole 52 and a pair of engagement holes 53. The guide hole 52 is elongated vertically in a direction orthogonal to the engagement groove 50 as viewed in plan. The engagement holes 53 extend circumferentially from upper ends of the guide hole 52 in a manner point-symmetrical with respect to the axis of the lock pin 46.

Figure 8A:
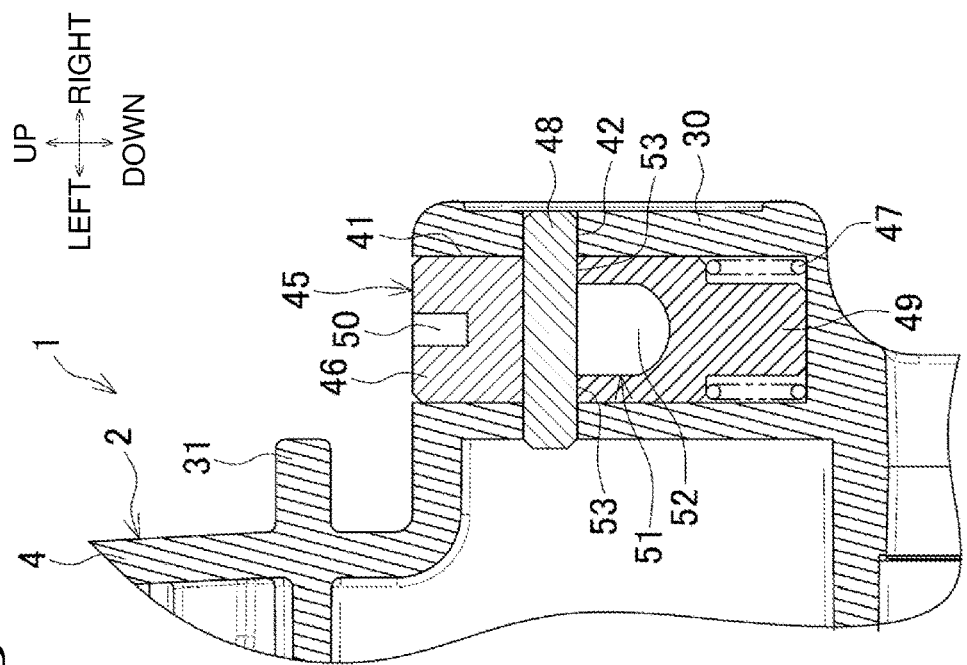
FIG. 8A is an enlarged cross-sectional view taken along line B-B in FIG. 3 with a lock pin at a protruding position.

As shown in FIG. 8A, the coil spring 47 is located on the bottom of the blind hole 41 below the lock pin 46. The coil spring 47 has an upper portion externally mounted on the smaller-diameter portion 49.

The retainer pin 48 is inserted from the right outside into a lateral hole 42 in the flange 30 laterally at the position of the blind hole 41. This allows the retainer pin 48 to extend orthogonally through the blind hole 41 and also through the through-hole 51 in the lock pin 46.

The lock pin 46 is thus urged upward by the coil spring 47 in a direction in which the lock pin 46 protrudes. However, the lock pin 46 is restricted from protruding by the retainer pin 48 that extends through the through-hole 51 at the position at which the retainer pin 48 is in contact with the lower end of the guide hole 52 in the through-hole 51. At this protruding position, as shown in FIG. 8A, the lock pin 46 has its upper portion partially protruding from the blind hole 41. The degree by which the lock pin 46 protrudes is substantially equal to the thickness of the fixture 21.

Figure 8B:
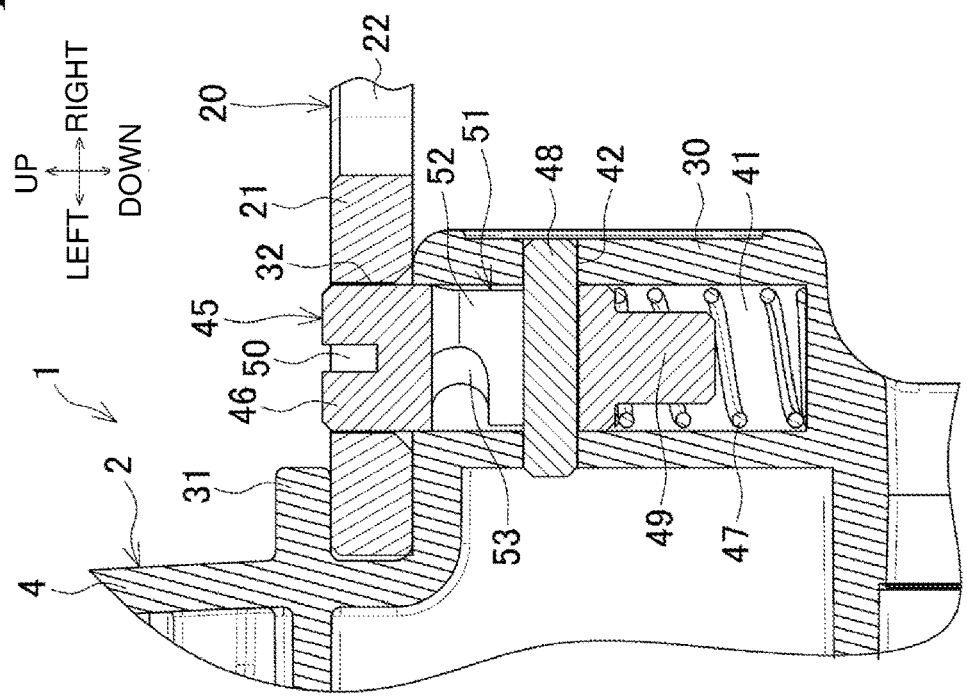
FIG. 8B is an enlarged cross-sectional view taken along line B-B in FIG. 3 with the lock pin at a retracted position, with the handle removed.

The lock pin 46 is then pushed further into the blind hole 41 to move the retainer pin 48 relatively to the upper end of the guide hole 52. In this state, the lock pin 46 is rotated to the left as viewed in plan (to be at a first rotational position). As shown in FIG. 8B, the engagement holes 53 then rotate and are engaged with the retainer pin 48. The lock pin 46 is restricted from moving at the retracted position at which the lock pin 46 is retracted in the blind hole 41. The lock pin 46 is rotated with a tool, such as a screwdriver, that is engaged in the engagement groove 50.

The lock pin 46 at the retracted position is rotated to the right as viewed in plan from the first rotational position (to be at a second rotational position). The engagement holes 53 then rotate backward and are disengaged from the retainer pin 48. Thus, the lock pin 46 moves to the protruding position shown in FIG. 8A as it is urged by the coil spring 47.

When the handle 20 is locked to the mixer 1, the lock pins 46 on the left and right lock units 45 are at their protruding positions. Each lock pin 46 at the protruding position is engaged with the engagement hole 32 in the fixture 21. Thus, the handle 20 is restricted by the lock pins 46 from sliding backward at the attachment position.

The male connector 34 is inserted into the receptacle 37 and is connected with the female connector 38. Thus, the terminal plates 39 and 40 in the female connector 38 are inserted into the slits 35 and 36 in the male connector 34 for electrical connection between the terminal plates.

In this state, the operator holds the left grip 24 and the right grip 25 on the handle 20. The mixer 1 is thus supported with the mixer shaft 3 protruding downward. In this state, the operator presses the trigger 27 on the right grip 25 to turn on the switch 26. The motor 6 is thus driven to rotate the rotational shaft 7. The rotation of the rotational shaft 7 is reduced by the reducer 15 in either a high speed mode or a variable speed mode selected with the switching lever 18 and is transmitted to the spindle 16. The mixer shaft 3 connected to the spindle 16 rotates to allow mixing of a material such as paint with the blade 19 rotating together with the mixer shaft 3.

During the operation, the operator holding the left and right grips 24 and 25 to support the mixer 1 views, from above the motor housing 4 and the battery cover 12, the blade 19 on the lower end of the mixer shaft 3, the mixer shaft 3, and the material being mixed. In this state, the fixture 21 in the handle 20 is not in front of the motor housing 4 and the battery cover 12 and thus can avoid obstructing the field of view of the operator. The operator can thus reliably view, for example, the blade 19.

Figure 9:
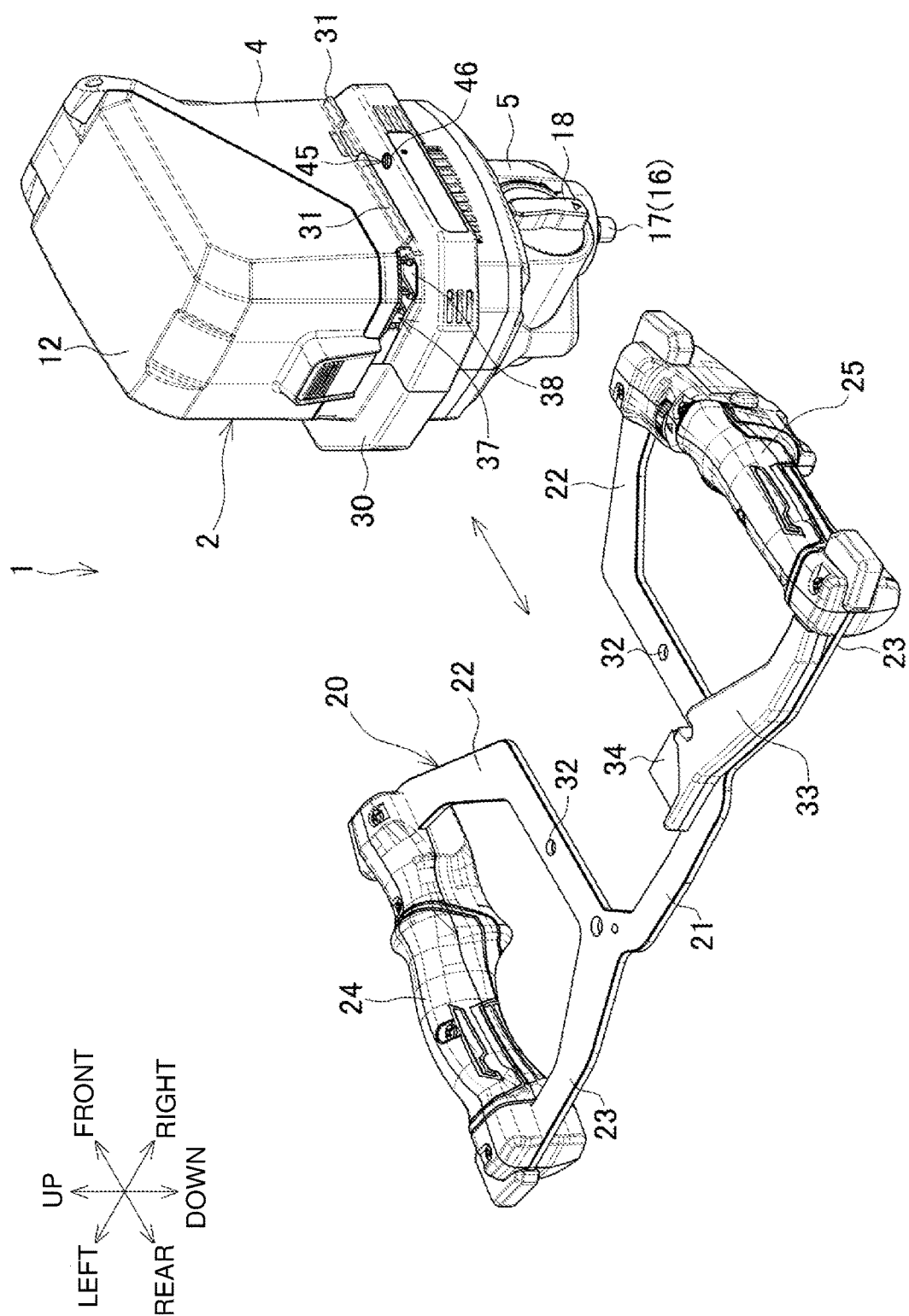
FIG. 9 is a perspective view of the body, with the handle removed.

When removing the handle 20 after the operation, the lock pin 46 in each lock unit 45 is pushed in to retract the lock pin 46 from the engagement hole 32 into the blind hole 41. Each lock pin 46 is then rotated to the first rotational position. Each lock pin 46 is then restricted from moving at the retracted position and is disengaged from the engagement hole 32. As shown in FIG. 9, the handle 20 can be slid backward at the attachment position and removed from the body 2.

When the handle 20 is removed, the male connector 34 is also removed from the receptacle 37. This disconnects the male connector 34 from the female connector 38 to disconnect electrical connection between the terminal plates.

To attach the handle 20 again, the handle 20 can be slid from the rear of the body 2 forward with the lock pins 46 being each at the retracted position, and the fixture 21 is then inserted between the flange 30 and the guide ribs 31. The handle 20 stops being slid at the attachment position at which the rear portion of the fixture 21 comes in contact with the rear surface of the body 2. At the attachment position of the handle 20, each lock pin 46 is rotated from above to the second rotational position. Each lock pin 46, which is disengaged from the retainer pin 48, moves to the protruding position under an urging force from the coil spring 47 and is engaged with the engagement hole 32 to lock the handle 20.

The mixer 1 according to the present embodiment includes the body 2 including the motor 6 and the spindle 16 (an example of an output shaft) rotatable when driven by the motor 6, protruding downward, and being connectable to the mixer shaft 3. The mixer 1 includes the handle 20 attachable to the body 2. The body 2 includes the lock units 45 engageable with the handle 20 at the attachment position of the handle 20 to the body 2 to lock the handle 20 at the attachment position. The lock units 45 are operable to disengage from the handle 20 to unlock the handle 20 at the attachment position.

In this structure, the handle 20 can be easily locked or unlocked at the attachment position by operating the lock units 45. With the handle 20 being removed, the mixer 1 is transportable and storable without using much space.

The handle 20 can be slid (an example of movement) from the rear (an example of a predetermined direction) relative to the body 2 and be set at the attachment position. The lock units 45 are engageable with the handle 20 attached to the body 2 and set at the attachment position.

Thus, the lock units 45 in the body 2 facilitate attachment and removal of the handle 20. The handle 20 can be simplified and be lighter.

The body 2 includes the flange 30 and the guide ribs 31 (each being an example of a guide) to guide the sliding of the handle 20. The lock units 45 are located on the flange 30.

The handle 20 can thus slide stably. The lock units 45 can easily be located on the flange 30.

Each lock unit 45 includes the lock pin 46 (an example of a lock member) movable between the protruding position at which the lock pin 46 protrudes from the flange 30 and the retracted position at which the lock pin 46 is retracted in the flange 30, and the coil spring 47 (an example of an urging member) that urges the lock pin 46 to the protruding position. The handle 20 has the engagement holes 32 (each being an example of an engagement portion) engageable with the lock pins 46 at the protruding positions.

Thus, the handle 20 is reliably locked with the lock pins 46.

Each lock unit 45 further includes the retainer pin 48 (an example of a retainer member) that restricts movement of the lock pin 46 at the protruding position. Each lock pin 46 has the engagement holes 53 (each being an example of an engagement portion) engageable with the retainer pin 48 at the retracted position. Each lock pin 46 is selectively operable between the first rotational position (an example of a first orientation) at which the engagement holes 53 are engaged with the retainer pin 48 at the retracted position to restrict movement to the protruding position and the second rotational position (an example of a second orientation) at which the engagement holes 53 are disengaged from the retainer pin 48 at the retracted position to allow movement to the protruding position.

Thus, each lock pin 46 can be maintained at the retracted position. The handle 20 can be slid on the body 2 for attachment or removal without interfering with the lock pins 46. The handle 20 can thus be attached and removed smoothly.

Each lock pin 46 is a rod. The flange 30 has the blind holes 41 to receive the lock pins 46. Each urging member is the coil spring between the bottom of the blind hole 41 and the lock pin 46.

The lock units 45 can thus be formed in a space-efficient manner.

The body 2 includes the controller 8 that controls the motor 6. The handle 20 includes the switch 26 (an example of an operation member) that outputs electric signals to the controller 8 in response to an operation and the adjustment dial 29 (an example of an operation member). The body 2 and the handle 20 include the male connector 34 and the female connector 38 (each being an example of a connector) that electrically connect the controller 8 to the switch 26 and to the adjustment dial 29 through contact at the attachment position of the handle 20 and that electrically disconnect the controller 8 from the switch 26 and from the adjustment dial 29 through being out of contact in response to the handle 20 being removed.

Any operation members on the handle 20 can be electrically connected and disconnected when the handle 20 is attached or removed.

The operation members are the switch 26 that turns on or off the motor 6 and the adjustment dial 29 that changes the rotational speed of the motor 6.

These operation members can be electrically connected and disconnected easily using the male connector 34 and the female connector 38.

The handle 20 includes the fixture 21 attachable to the body 2, the front and rear arms 22 and 23 (each being an example of an arm) extending from the fixture 21 outward to the left and to the right, and the left and right grips 24 and 25 (each being an example of a grip) attached to the front and rear arms 22 and 23.

The body 2 can thus be supported in a balanced manner on the left and the right.

The fixture 21 and the front and rear arms 22 and 23 are included in an integral metal sheet.

The handle 20 can thus be manufactured easily.

The fixture 21 is U-shaped as viewed in plan and surrounds the left and right portions and the rear portion of the body 2 and is open at the front.

This structure allows the operator to view the blade 19 and other components reliably, without the field of view being obstructed by the fixture 21, and thus can have improved workability.

The same number of lock units 45 are located on each of the left and the right of the fixture 21 (a single lock unit 45 on each side in this example).

The handle 20 can be locked to the body 2 in a well-balanced manner.

Modifications will now be described.

Each lock pin may be restricted from moving at the protruding position or at the retracting position with a structure other than the retainer pin and the through-hole described above. For example, each lock pin may be integral with a retainer pin that is engaged in a guide groove on the inner surface of the blind hole. A rotational operation of the lock pin may then cause the retainer pin to be engaged at a selected position in the guide groove to move to the protruding position or to the retracted position.

The pin integral with the lock pin may protrude outward through a slit in the flange. In this case, the pin may be moved to the protruding position or to the retracted position with an operation to cause the pin to be engaged at a selected position in the slit.

The lock members may not be rods such as the lock pins. The lock members may be plates that can be engaged with and disengaged from the handle. The lock member may have another shape and may be selectively at the protruding position or the retracted position with a method other than a rotational operation. For example, a lock member may be movable with a swinging operation to select from two orientations.

An urging member other than the coil spring may also be used. The lock member may be operable to move between the protruding position and the retracted position without the use of the urging member.

The number and arrangement of lock units may be changed as appropriate.

Multiple lock units may be located on each of the left and the right of the fixture, and a lock unit may also be located at the rear of the fixture. Lock units may be located on guide ribs, instead of being on the flange, and lock pins protruding downward may be engaged with the handle. Thus, each engagement portion may not be the engagement hole, but may be a recess.

The lock units may be located on the handle, instead of being located on the body. Lock members may protrude from the handle and be engaged with engagement portions located on the body.

The handle may be slid relative to the body from the front, instead of from the rear. The handle may have another shape and may be moved in the lateral direction for attachment. The handle may be attached in the vertical direction.

The guides for the handle may not be the ribs on the housing as described above. The guides may be grooves recessed in the housing.

The handle is not limited to the handle including the front and rear arms as described above. For example, the handle may include front arms alone on the left and the right and may include left and right grips. The fixture may not be U-shaped as viewed in plan, but may be a ring surrounding the entire periphery of the body.

The operation members are not limited to the switch and the adjustment dial.

The connection between each operation member and the controller is not limited to the connection described above. For example, the male connector and the female connector may be located reversely from the above example. The shape of each connector and the number of terminal plates may be changed as appropriate. A separate connector may be provided for each terminal. The connectors may be eliminated from the handle that has no operation members.

The shape of the body, the arrangement of the motor inside, and the position of the controller may be changed as appropriate.

The battery mount may be located differently, rather than being located on the upper portion of the motor housing. The battery mount may be on a side surface or a rear surface of the motor housing.

The power supply is not limited to batteries. The motor may receive utility power (alternating current or AC) with a power cable.

The length of the mixer shaft, the attaching structure for the mixer shaft attached to the spindle, as well as the shape of the blade are not limited to those described above.

The present disclosure is not limited to the mixer. The present disclosure is also applicable to a power tool including an output shaft protruding downward from the body to which the handle is attached, and to which a tip tool such as an auger bit or a drill bit is connectable. Examples of such a power tool include an earth auger and an electric hammer.

More specifically, the power tool according to one or more embodiments of the present disclosure includes the body including the motor and the output shaft rotatable when driven by the motor, protruding downward, and being connectable to a tip tool, and the handle attachable to the body. The power tool includes the lock units attached to the body. The lock units are engaged with the handle at the attachment position of the handle to the body to lock the handle at the attachment position. An operation to disengage the handle using the lock units then allows the handle to be unlocked at the attachment position.

The components including the body, the handle, and the lock units may have the same structures as the corresponding components of the mixer according to the above embodiments (and the modifications).

REFERENCE SIGNS LIST 1 mixer
2 body
3 mixer shaft
4 motor housing
5 reducer housing
6 motor
7 rotational shaft
8 controller
15 reducer
16 spindle
19 blade
20 handle
21 fixture
22 front arm
23 rear arm
24 left grip
25 right grip
26 switch
27 trigger
29 adjustment dial
30 flange
31 guide rib
32 engagement hole
33 lead wire cover
34 male connector
35, 36 slit
37 receptacle
38 female connector
39, 40 terminal plate
41 blind hole
45 lock unit
46 lock pin
47 coil spring
48 retainer pin
50 engagement groove
51 through-hole
52 guide hole
53 engagement hole

What is claimed is:

1. A mixer, comprising:
   a body including a motor and an output shaft rotatable when driven by the motor, the output shaft extending downward and being connectable to a mixer shaft;
   a handle attachable to the body; and
   a lock unit located on the body, the lock unit being engageable with the handle at an attachment position of the handle to the body to lock the handle at the attachment position, the lock unit being operable to disengage from the handle to unlock the handle at the attachment position, wherein:
   the handle is movable in a predetermined direction relative to the body and is set at the attachment position,
   the lock unit is engageable with the handle attached to the body and set at the attachment position,
   the body includes a guide to guide movement of the handle,
   the lock unit is located on the guide,
   the lock unit includes
      a lock member movable between a protruding position at which the lock member protrudes from the guide and a retracted position at which the lock member is retracted in the guide, and
      an urging member configured to urge the lock member to the protruding position, and
   the handle includes an engagement portion engageable with the lock member at the protruding position.

2. The mixer according to claim 1, wherein
   the lock unit further includes a retainer member configured to restrict movement of the lock pin at the protruding position,
   the lock member includes an engagement portion engageable with the retainer member at the retracted position, and
   the lock member is selectively operable between a first orientation in which the engagement portion is engaged with the retainer member at the retracted position to restrict movement to the protruding position and a second orientation in which the engagement portion is disengaged from the retainer member at the retracted position to allow movement to the protruding position.

3. The mixer according to claim 2, wherein
   the lock member includes a rod,
   the guide has a blind hole to receive the lock member, and
   the urging member includes a coil spring between a bottom of the blind hole and the lock member.

4. The mixer according to claim 1, wherein
   the lock member includes a rod,
   the guide has a blind hole to receive the lock member, and
   the urging member includes a coil spring between a bottom of the blind hole and the lock member.

5. The mixer according to claim 1, wherein
   the body includes a controller configured to control the motor,
   the handle includes an operation member configured to output an electric signal to the controller in response to an operation, and
   the body and the handle each include a connector configured to electrically connect the controller to the operation member through contact at the attachment position of the handle, and to electrically disconnect the controller from the operation member through being out of contact in response to the handle being removed.

6. The mixer according to claim 5, wherein
   the operation member includes
      a switch configured to turn on and off the motor, and
      an adjustment dial configured to change a rotational speed of the motor.

7. The mixer according to claim 1, wherein
   the handle includes
      a fixture attachable to the body,
      arms extending from the fixture outward to a left and to a right, and
      grips attached to the arms.

8. The mixer according to claim 7, wherein
   the fixture and the arms are included in an integral metal sheet.

9. The mixer according to claim 7, wherein
   the fixture is U-shaped as viewed in plan, and the fixture surrounds left and right portions and a rear portion of the body and is open at a front.

10. The mixer according to claim 7, wherein
a plurality of the lock units are located on a left and a right of the fixture, and the same number of at least one lock unit of the plurality of lock units is located on each of the left and the right of the fixture.

11. A mixer, comprising:
a body including a motor and an output shaft rotatable when driven by the motor, the output shaft extending downward and being connectable to a mixer shaft;
a handle attachable to the body; and
a lock unit located on the handle, the lock unit being engageable with the body at an attachment position of the handle to the body to lock the handle at the attachment position, the lock unit being operable to disengage from the body to unlock the handle at the attachment position, wherein:
the handle is movable in a predetermined direction relative to the body and is set at the attachment position,
the lock unit is engageable with the handle attached to the body and set at the attachment position,
the body includes a guide to guide movement of the handle,
the lock unit includes
 a lock member movable between a protruding position at which the lock member protrudes from the guide and a retracted position at which the lock member is retracted in the guide, and
 an urging member configured to urge the lock member to the protruding position, and
the handle includes an engagement portion engageable with the lock member at the protruding position.

12. The mixer according to claim 11, wherein
the body includes a controller configured to control the motor,
the handle includes an operation member configured to output an electric signal to the controller in response to an operation, and
the body and the handle each include a connector configured to electrically connect the controller to the operation member through contact at the attachment position of the handle, and to electrically disconnect the controller from the operation member through being out of contact in response to the handle being removed.

13. A power tool, comprising:
a body including a motor and an output shaft rotatable when driven by the motor, the output shaft extending downward and being connectable to a tip tool;
a handle attachable to the body; and
a lock unit located on the body, the lock unit being engageable with the handle at an attachment position of the handle to the body to lock the handle at the attachment position, the lock unit being operable to disengage from the handle to unlock the handle at the attachment position, wherein
 the handle is movable in a predetermined direction relative to the body and is set at the attachment position,
 the lock unit is engageable with the handle attached to the body and set at the attachment position,
 the body includes a guide to guide movement of the handle,
 the lock unit is located on the guide,
 the lock unit includes
  a lock member movable between a protruding position at which the lock member protrudes from the guide and a retracted position at which the lock member is retracted in the guide, and
  an urging member configured to urge the lock member to the protruding position, and
 the handle includes an engagement portion engageable with the lock member at the protruding position.

* * * * *